(No Model.)

H. E. T. GERHARD.
MAT OR SIMILAR FLEXIBLE ARTICLE.

No. 490,556. Patented Jan. 24, 1893.

WITNESSES:
H. H. Walker
E. M. Clark

INVENTOR
H. E. T. Gerhard
BY Munn & Co
ATTORNEYS.

UNITED STATES PATENT OFFICE.

HENRY E. T. GERHARD, OF MATTAPAN, MASSACHUSETTS, ASSIGNOR OF ONE-HALF TO EDWIN J. TUCKER, OF NEW YORK, N. Y.

MAT OR SIMILAR FLEXIBLE ARTICLE.

SPECIFICATION forming part of Letters Patent No. 490,556, dated January 24, 1893.

Application filed May 16, 1892. Serial No. 433,113. (No model.)

*To all whom it may concern:*

Be it known that I, HENRY E. T. GERHARD, of Mattapan, in the county of Suffolk and State of Massachusetts, have invented new and useful Improvements in Mats or Similar Flexible Articles, of which the following is a full, clear, and exact description.

My invention relates to improvements in mats, or other analogous flexible articles, and the object of my invention is to produce a simple and comparatively inexpensive article adapted to be easily cleaned when soiled.

A further and principal object of the invention is to provide for utilizing the waste scraps of waterproof material produced in the manufacture of waterproof garments.

To these ends, my invention consists in a mat, or similar article, constructed substantially as hereinafter described and claimed.

Reference is to be had to the accompanying drawings forming a part of this specification, in which similar figures of reference indicate corresponding parts in all the views.

Figure 1:
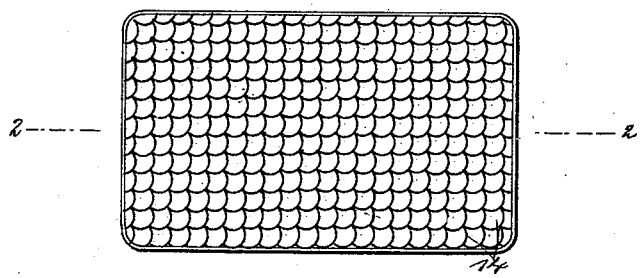
Figure 2:
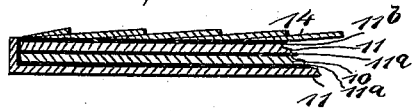
Figure 3:
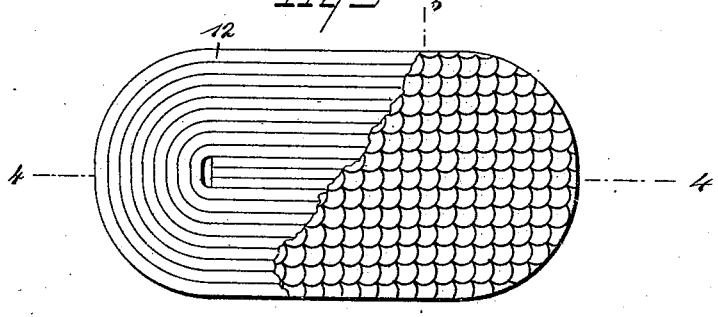
Figure 4:
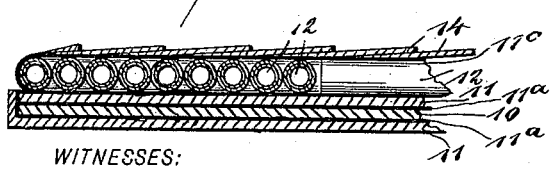

Figure 1 is a plan view of a mat embodying my invention; Fig. 2 is a broken cross section of the same on the line 2—2 in Fig. 1; Fig. 3 is a plan of a modified form of mat; Fig. 4 is a broken section on the line 4—4 in Fig. 3; and Fig. 5 is a broken cross section on the line 5—5 in Fig. 3.

In the following description I will describe a mat constructed in accordance with my invention, and it will be understood that any similar flexible article can be constructed in the same way.

The base of the mat comprises an inner layer 10 of fabric, preferably burlap, although any other fabric having suitable strength and body may be used, and outside layers 11 of waterproof rubber cloth, which are cemented with rubber cement $11^a$ to both sides of the fabric 10, one layer 11 being made to overlap the edges of the fabric. Upon the top of the base I now place overlapping layers or strips 14, composed of waterproof rubber cloth, which I firmly cement to the base by means of a layer of rubber cement $11^b$. These strips 14 are preferably formed of the scraps which are left in the manufacture of waterproof rubber garments or similar articles, the scraps being the waste which is left after the patterns are cut out of the webs of rubber cloth. These strips or scraps may be of different colors and cut so as to produce any desired design, and consequently they may be made to furnish ornamentation for the mat. The strips or scraps 14 are secured in such a way that one or both edges of each strip will be loose, thus producing a mat with a soft surface. Instead of the strips or scraps mentioned, any other suitable material may be secured to the top of the mat so as to give it a proper surface. After the strips or scraps are secured to the body the entire mat is vulcanized, which operation secures all the parts together and makes the mat very durable and effective. The article thus made may be easily cleaned by washing. The strips or scraps 14 which are applied to the top of the mat give to it a soft and pliable surface, and the rubber cement used in the construction of the mat assists in the thorough binding together of all the parts.

Figure 5:
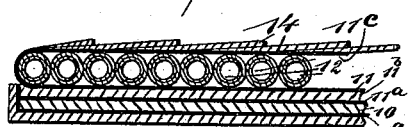

In Figs. 3 to 5, I have shown a modified form of mat, in which tubes 12 are arranged side by side or in a coil, so as to cover the base. These tubes are made of rubber or analogous material so as to be flexible and waterproof, and they are firmly cemented together and also cemented to the base by means of a layer of rubber cement $11^b$. The strips 14 of waterproof rubber cloth above mentioned are then firmly cemented to the tops of the tubes by a layer of rubber cement $11^c$, and they thus give the desired surface to the mat. When constructed in this way the mat has a soft surface as above described, and the body is also made very elastic by reason of the yielding nature of the tubes.

From the foregoing description it will be understood that the burlap and other fabric used in the mat costs but little, and that the scraps or strips 14 are composed of what is practically waste material and consequently the mat or other article may be very cheaply made.

Having thus described my invention, I claim as new, and desire to secure by Letters Patent:—

1. As an improved article of manufacture, a mat, or similar flexible article, comprising a flexible waterproof base, and a surface of overlapping scraps or strips, the base and scraps being secured together by rubber cement and vulcanized, substantially as described.

2. As an improved article of manufacture, a mat, or similar flexible article, comprising a flexible base, a body formed of flexible tubes secured to the base, and an outer surface of waterproof scraps or strips, the several parts being held together by rubber cement and vulcanized, substantially as described.

HENRY E. T. GERHARD.

Witnesses:
E. M. CLARK,
F. W. HANAFORD.